United States Patent
McQuaide et al.

(10) Patent No.: US 11,681,097 B2
(45) Date of Patent: Jun. 20, 2023

(54) TAPERED SCANNING FIBER WITH POLARIZATION MAINTAINING ELEMENTS

(71) Applicant: Magic Leap, Inc., Plantation, FL (US)

(72) Inventors: Sarah Colline McQuaide, Seattle, WA (US); Brian T. Schowengerdt, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 77 days.

(21) Appl. No.: 17/318,913

(22) Filed: May 12, 2021

(65) Prior Publication Data
US 2021/0356654 A1 Nov. 18, 2021

Related U.S. Application Data

(60) Provisional application No. 63/025,726, filed on May 15, 2020.

(51) Int. Cl.
| | |
|---|---|
| *G02B 6/24* | (2006.01) |
| *G02B 6/024* | (2006.01) |
| *G02B 6/36* | (2006.01) |
| *F21V 8/00* | (2006.01) |
| *C03C 25/68* | (2006.01) |

(52) U.S. Cl.
CPC .............. *G02B 6/024* (2013.01); *C03C 25/68* (2013.01); *G02B 6/0046* (2013.01); *G02B 6/3692* (2013.01)

(58) Field of Classification Search
CPC ...................................................... C03C 25/68
See application file for complete search history.

(56) References Cited

U.S. PATENT DOCUMENTS

| | | | | |
|---|---|---|---|---|
| 2002/0081072 | A1* | 6/2002 | Ootsu | G02B 6/262 385/123 |
| 2002/0110321 | A1* | 8/2002 | Ouali | G02B 6/4203 385/33 |
| 2004/0151466 | A1* | 8/2004 | Crossman-Bosworth | G02B 6/25 385/140 |
| 2018/0180812 | A1* | 6/2018 | Schowengerdt | G02B 6/262 |

FOREIGN PATENT DOCUMENTS

| | | | |
|---|---|---|---|
| JP | 2006208335 A | * 8/2006 | |
| WO | WO-2006116738 A1 | * 11/2006 | B82Y 20/00 |

* cited by examiner

*Primary Examiner* — Eric Wong
(74) *Attorney, Agent, or Firm* — Kilpatrick Townsend & Stockton LLP

(57) ABSTRACT

A method of forming a tapered tip of a polarization-maintaining (PM) fiber includes inserting a tip of the PM fiber into a first etchant solution characterized by a first etching rate for the core of the PM fiber and a second etching rate for the stress members of the PM fiber, the second etching rate being lower than the first etching rate, withdrawing the tip of the PM fiber from the first etchant solution at a withdrawal rate, immersing the tip of the PM fiber in a second etchant solution for a time duration. The second etchant solution is characterized by a third etching rate for the core and a fourth etching rate for the stress members, the fourth etching rate being greater than the third etching rate. The method further includes withdrawing the tip of the PM fiber from the second etchant solution.

19 Claims, 14 Drawing Sheets

1100

Insert a tip of a PM fiber into a first etchant solution, the PM fiber including a core, a cladding surrounding the core, and one or more stress members embedded in the cladding, the first etchant solution being characterized by a first etching rate for the cladding and a second etching rate for the one or more stress members, the second etching rate being lower than the first etching rate
1110

Withdraw the tip of the PM fiber from the first etchant solution at a withdrawal rate
1120

After the tip of the PM fiber is withdrawn from the first etchant solution, immerse the tip of the PM fiber in a second etchant solution for a time duration, the second etchant solution being characterized by a third etching rate for the cladding and a fourth etching rate for the stress members, the fourth etching rate being greater than the third etching rate
1130

Withdraw the tip of the PM fiber from the second etchant solution
1140

*FIG. 11*

TAPERED SCANNING FIBER WITH POLARIZATION MAINTAINING ELEMENTS

CROSS-REFERENCES TO RELATED APPLICATIONS

This application claims the benefit of priority to U.S. Provisional Patent Application No. 63/025,726, filed May 15, 2020, entitled "TAPERED SCANNING FIBER WITH POLARIZATION MAINTAINING ELEMENTS," the disclosure of which is hereby incorporated by reference in its entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems for fabricating elements for fiber scanning image projectors for waveguide displays. More particularly, embodiments of the present invention provide methods and systems that enable the etching of polarization-maintaining fibers while maintaining a substantially circular transverse cross section at the tip of the PM fiber. The invention is applicable to a variety of applications in computer vision and image display systems.

According to some embodiments, a method of forming a tapered tip of a polarization-maintaining (PM) fiber includes inserting a tip of the PM fiber into a first etchant solution. The PM fiber includes a core, a cladding surrounding the core, and one or more stress members embedded in the cladding. The first etchant solution is characterized by a first etching rate for the cladding and a second etching rate for the stress members lower than the first etching rate. The method further includes withdrawing the tip of the PM fiber from the first etchant solution at a withdrawal rate, inserting the tip of the PM fiber into a second etchant solution characterized by a third etching rate for the cladding and a fourth etching rate for the stress members greater than the third etching rate, immersing the tip of the PM fiber in the second etchant solution for a time duration, and withdrawing the tip of the PM fiber from the second etchant solution.

According to some embodiments, a method of forming a tapered tip of a polarization-maintaining (PM) fiber includes inserting a tip of the PM fiber into a first etchant solution. The PM fiber includes a core, a cladding surrounding the core, and one or more stress members embedded in the cladding. The first etchant solution is characterized by a first etching rate for the cladding and a second etching rate for the one or more stress members. The second etching rate is lower than the first etching rate. The method further includes withdrawing the tip of the PM fiber from the first etchant solution at a withdrawal rate, and after the tip of the PM fiber is withdrawn from the first etchant solution, immersing the tip of the PM fiber in a second etchant solution for a time duration. The second etchant solution is characterized by a third etching rate for the cladding and a fourth etching rate for the stress members. The fourth etching rate is greater than the third etching rate. The method further includes withdrawing the tip of the PM fiber from the second etchant solution.

Numerous benefits are achieved by way of the present invention over conventional techniques. For example, embodiments of the present invention provide methods and systems that form a tapered fiber with a circular cross-sectional geometry that is suitable for use in a fiber scanning projector. In other embodiments, an oval cross-section is achieved, resulting in a fiber with balanced mechanical properties. These and other embodiments of the invention along with many of its advantages and features are described in more detail in conjunction with the text below and attached figures.

BRIEF DESCRIPTION OF THE DRAWINGS

FIG. 11 shows a simplified flowchart illustrating a method of forming a tapered tip of a polarization-maintaining (PM) fiber according to some embodiments.

DETAILED DESCRIPTION OF SPECIFIC EMBODIMENTS

Embodiments of the present invention relate to methods and systems for fabricating elements for fiber scanning systems in image projectors. An image projector can be an optical device that projects an image (e.g., stationary image or video image) for a user to view. In some examples, the image projector can project an image in the form of light into one or more eyes of a user. The image projector may include one or more fiber scanning systems, which can each project light, using a fiber optic scanning element and an actuator, in various patterns (e.g., raster scan, spiral scan, Lissajous, or the like) into the one or more eyes of the user.

Figure 1:
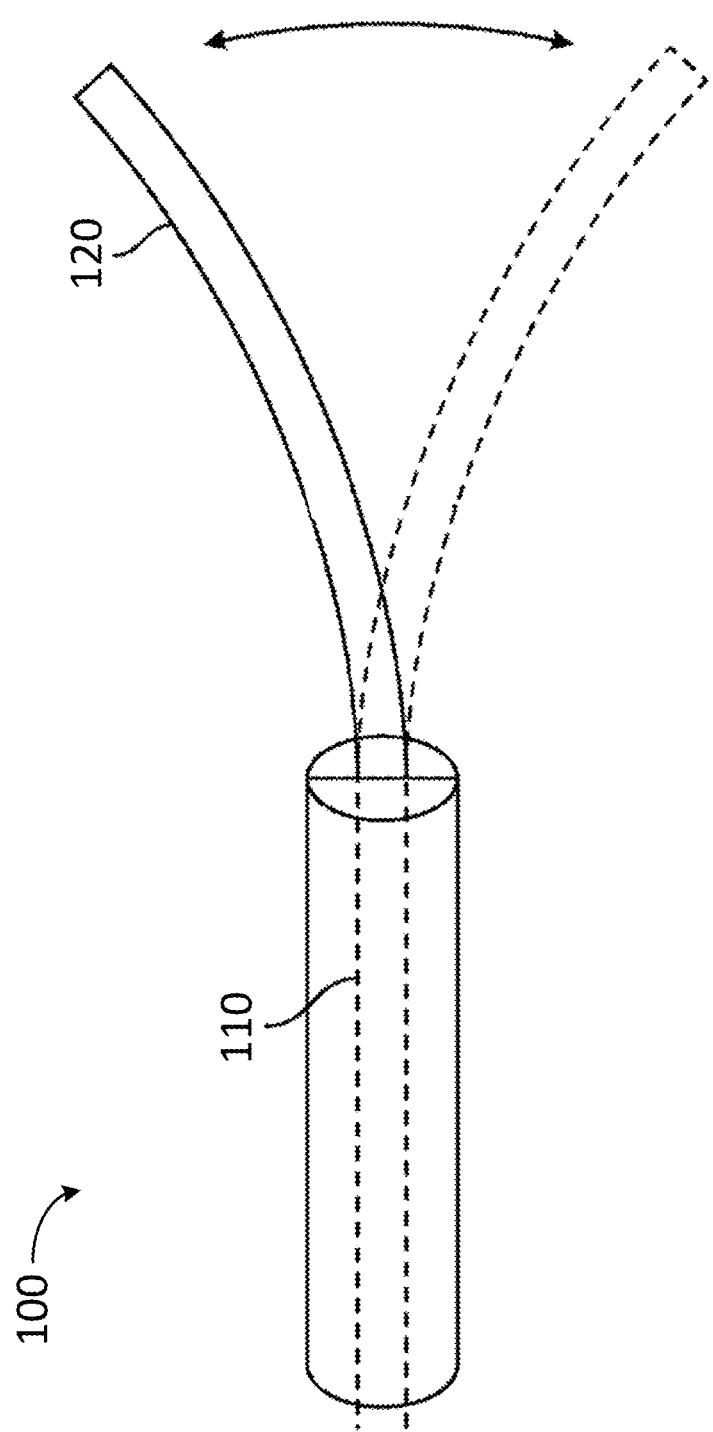
FIG. 1 illustrates an example of a fiber scanning system according to some embodiments.

FIG. 1 illustrates an example of a fiber scanning system 100 according to some embodiments. The fiber scanning system 100 can include an actuator 110 (e.g., a piezoelectric tube) and a fiber optic scanning element 120 (e.g., a single fiber or a multicore fiber optic scanning element). In some examples, the actuator 110 can be coupled to the fiber optic scanning element 120, causing the fiber optic scanning element 120 to be cantilevered. In such examples, the actuator 110 may be used to scan (or move) a tip of the fiber optic scanning element 120 for projecting light to one or more eyes of a user.

Figure 2:
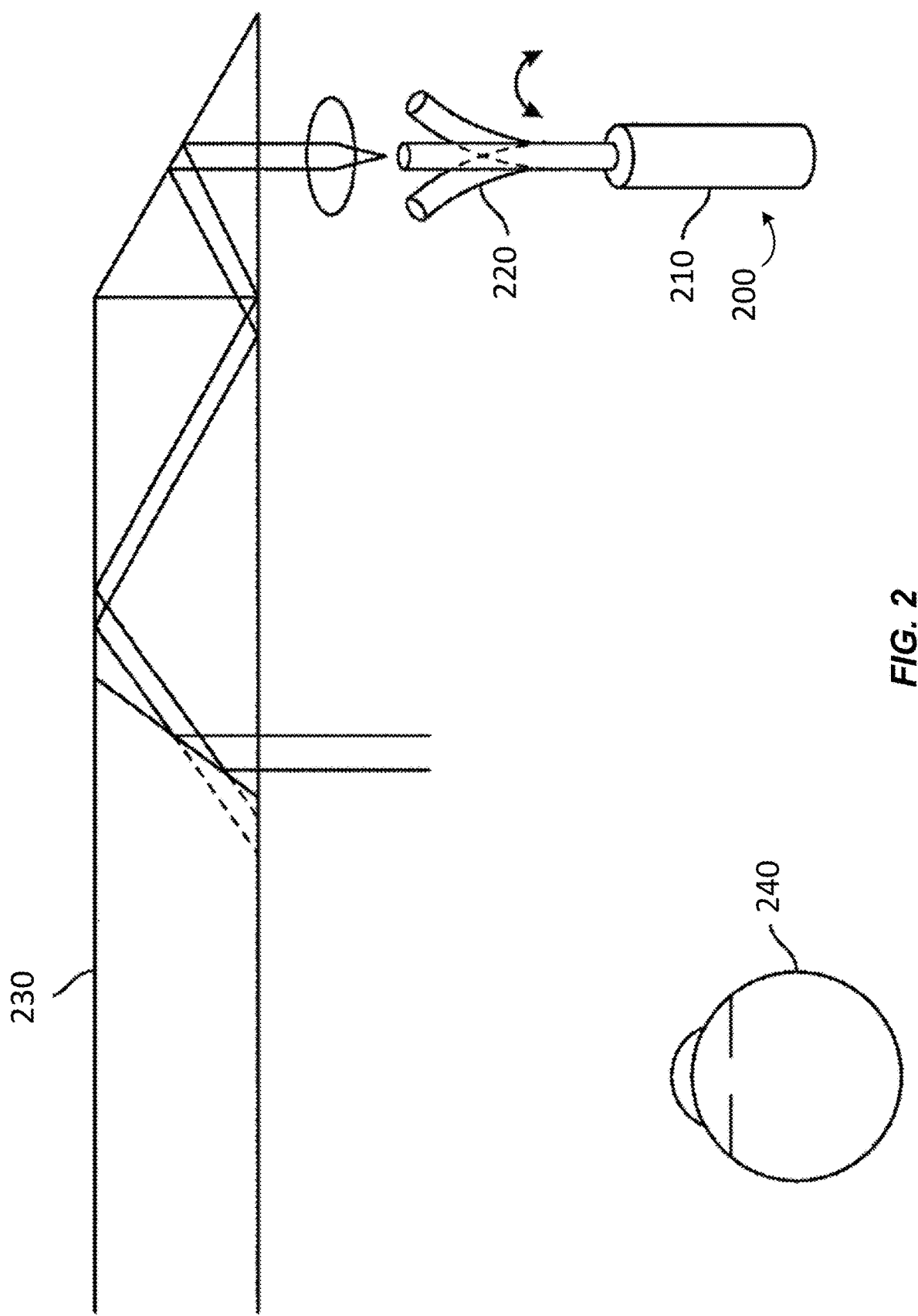
FIG. 2 illustrates an example of an image projector using a fiber scanning system according to some embodiments.

FIG. 2 illustrates an example of an image projector using a fiber scanning system 200 according to some embodiments. In some examples, the fiber scanning system 200 can include an actuator 210 (which can correspond to the actuator 110 in FIG. 1) and a fiber optic scanning element 220 (which can correspond to the fiber optic scanning element 120 in FIG. 1). In such examples, the fiber optic scanning element 220 can be scanned by the actuator 210 to create a set of beamlets with a plurality of angles of incidence and points of intersection that are relayed to an eye 240 by a waveguide 230. For example, a collimated light field image can be injected into the waveguide 230 to be outcoupled to the eye 240.

Figure 3:
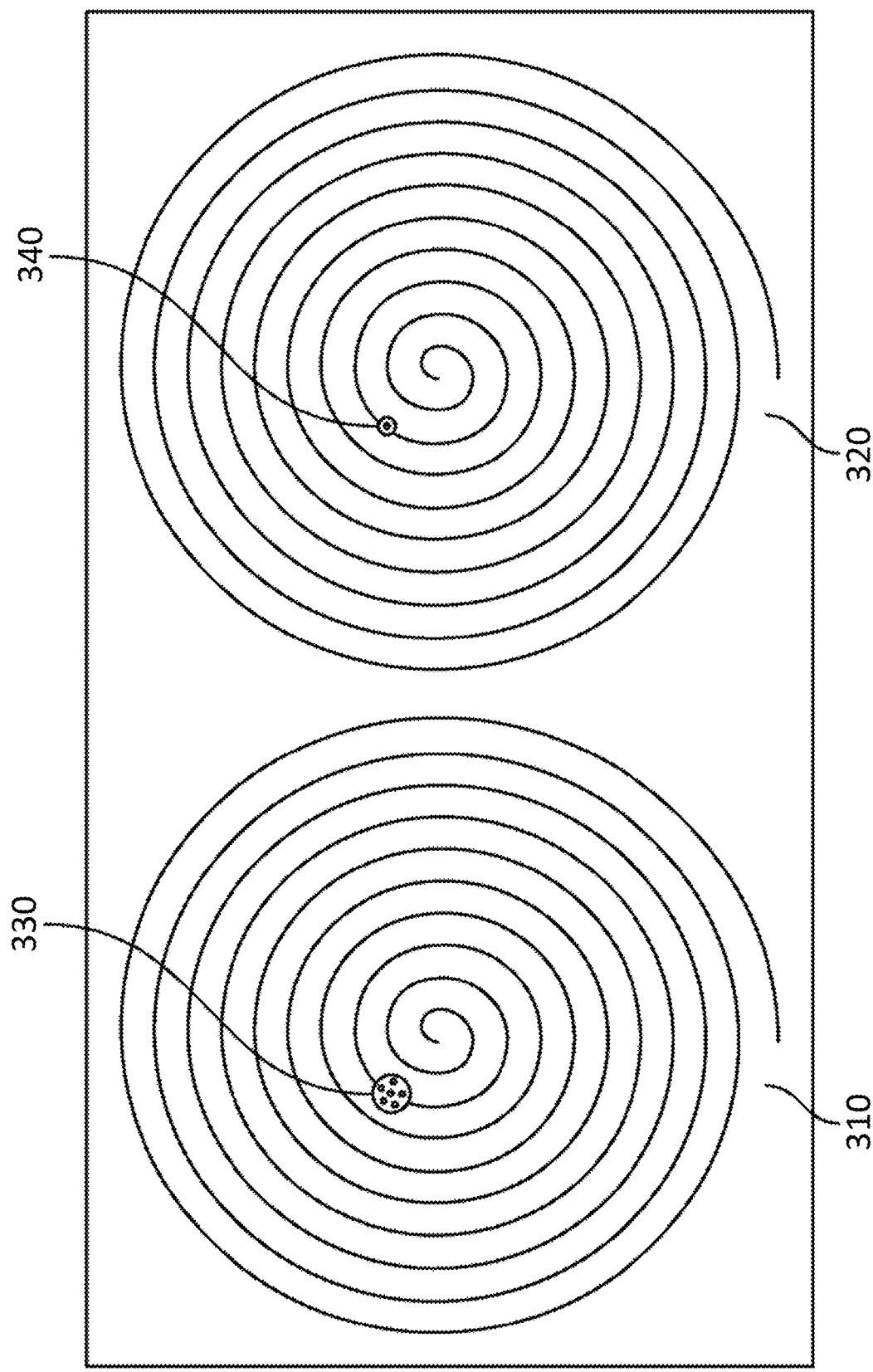
FIG. 3 illustrates an example of a spiral pattern formed by a fiber scanning system according to some embodiments.

FIG. 3 illustrates an example of a spiral pattern formed by a fiber scanning system according to some embodiments. In particular, spiral 310 illustrates a multicore fiber optic scanning element 330 and spiral 320 illustrates a single fiber optic scanning element 340. In some examples, a constant pattern pitch can provide for a uniform display resolution. In such examples, a pitch can be a distance between successive spiral passes along a common vector from an origin of the multicore fiber optic scanning element 330.

Figure 4:
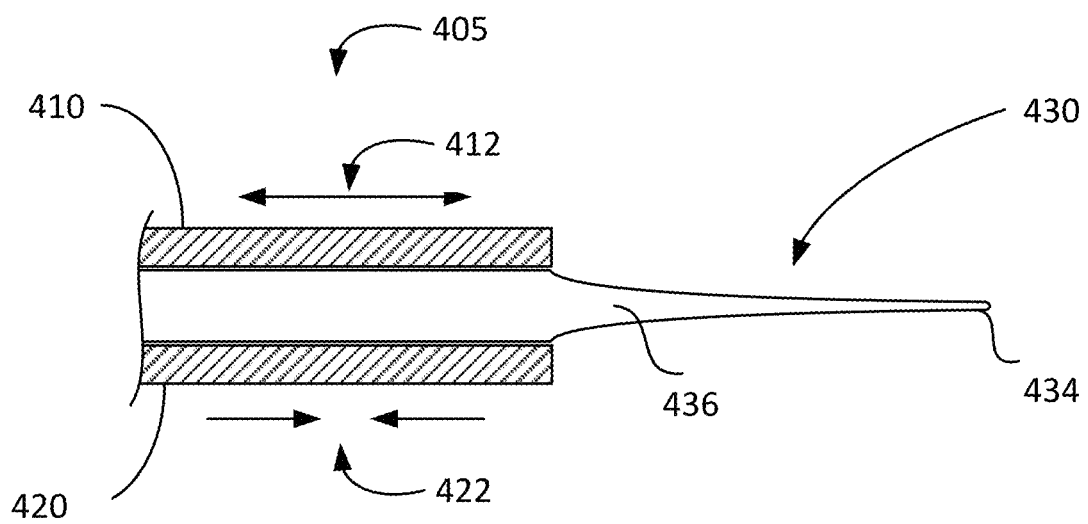
FIG. 4 is a simplified side view illustrating an exemplary fiber of a fiber scanning system according to some embodiments.

In some examples, the tip of an optical fiber scanning element may be tapered. FIG. 4 is a simplified side view illustrating an exemplary optical fiber 430 of a fiber scanning system according to some embodiments. In this example, a motion actuator 405 utilizes a piezoelectric structure that includes a first longitudinal side member 410 expanding or distending as illustrated by arrows 412 while a second longitudinal side member 420 opposing the first longitudinal side member 410 is contracting, as illustrated by arrows 422. As series of opposing expansion and contraction motions will oscillate the tip 434 of the optical fiber 430 in the plane of the figure. The tip 434 is also referred to as a light emission tip.

The optical fiber 430 includes a light delivery region 436 adjacent the right end of the motion actuator 405, and the light emission tip 434. The optical fiber 430 is tapered in some embodiments such that the light delivery region 436 is characterized by a first diameter and the light emission tip 434 is characterized by a second diameter that is less than the first diameter. The tapering can be continuous (i.e., constantly decreasing diameter as a function of position) in some embodiments. In some embodiments, the optical fiber 430 tapers from a width of about 200 μm-250 μm in the light delivery region 436 to a width of about 20 μm-40 μm at the light emission tip 434.

The tapering in the light delivery region 436 can be rapid, with the tapering decreasing in rate as it approaches the light emission tip 434. Thus, the slope of the taper can be large in the light delivery region 436 and smaller near the light emission tip 434. As an example, the starting diameter of the optical fiber 430 can be in the range of 200 μm-250 μm, the rapid tapering can reduce the diameter to a value in the range of 100 μm-125 μm within about 50 μm to 100 μm, for example, 85 μm of fiber length, and then the tapering profile can be reduced to a substantially linear taper to a diameter at the light emission tip 434 of 20 μm-40 μm, for example, 30 μm, 35 μm, or the like. The rapid tapering in the light delivery region can provide strain and/or stress relief and, as a result, the tapering profile in this region can be selected to reduce or minimize strain on the optical fiber 430 during actuation and reduce stress localization.

According to some embodiments, a tapered tip may be formed in an optical fiber by an etching process as discussed below with reference to FIGS. 5A-5C and 6.

Figure 5A:
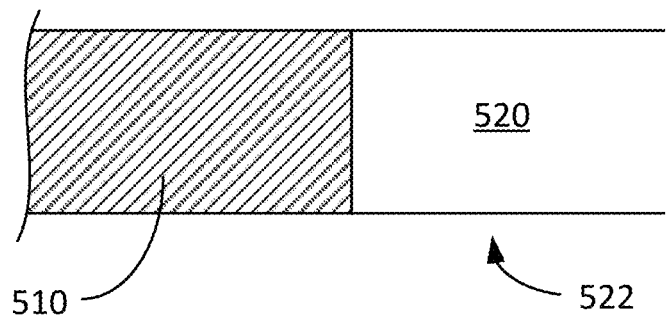
FIG. 5A is a simplified side view illustrating a portion of an optical waveguide and an etch-resistant jacket according to an embodiment of the present invention.

FIG. 5A is a simplified side view illustrating a portion of an optical waveguide and an etch-resistant jacket according to an embodiment of the present invention. As illustrated in FIG. 5A, an optical waveguide 520, which can be a fiber, is partially coated with an etch-resistant jacket 510. The etch-resistant jacket 510 can be formed using materials that are resistant to etching, or the like.

Figure 5B:
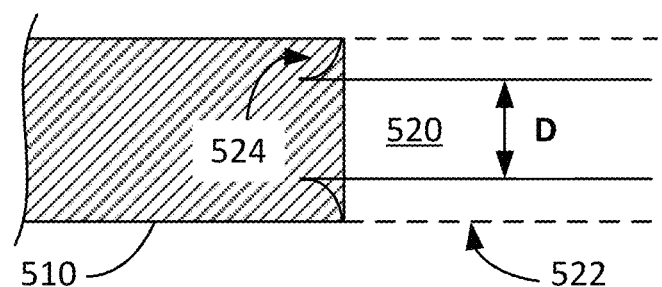
FIG. 5B is a simplified side view illustrating the portion of the optical waveguide illustrated in FIG. 5A, after being exposed to an etchant solution according to some embodiments.

FIG. 5B is a simplified side view illustrating the portion of the optical waveguide 520 illustrated in FIG. 5A, after being exposed to an etchant solution according to some embodiments. As the optical waveguide 520 and the etch-resistant jacket 510 are exposed to an etchant solution, the exposed portion 522 of the waveguide 520 will be etched as illustrated by the decrease in diameter D of the waveguide 520. Additionally, an inclusion can be formed at the interface between the jacket 510 and the waveguide 520, due to capillary action on the etchant. As a result, some of the etchant may wick under the jacket 510, forming a reentrant profile 524 as illustrated in FIG. 5B.

Figure 5C:
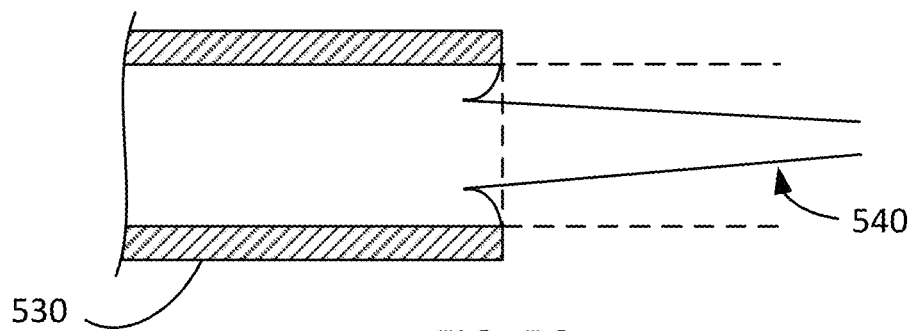
FIG. 5C is a simplified side view illustrating tapering of the optical waveguide illustrated in FIG. 5B according to an embodiment.

FIG. 5C is a simplified side view illustrating tapering of the optical waveguide 520 according to some embodiments. After formation of the reentrant profile 524, a tapered profile 540 illustrated in FIG. 5C can be fabricated using additional material removal processes. As an example, the original etch-resistant jacket 510 could be removed and/or the fiber 520 could be coated again with an additional etch-resistant jacket 530. A second etch process could be used to form the desired tapered profile 540.

Figure 6:
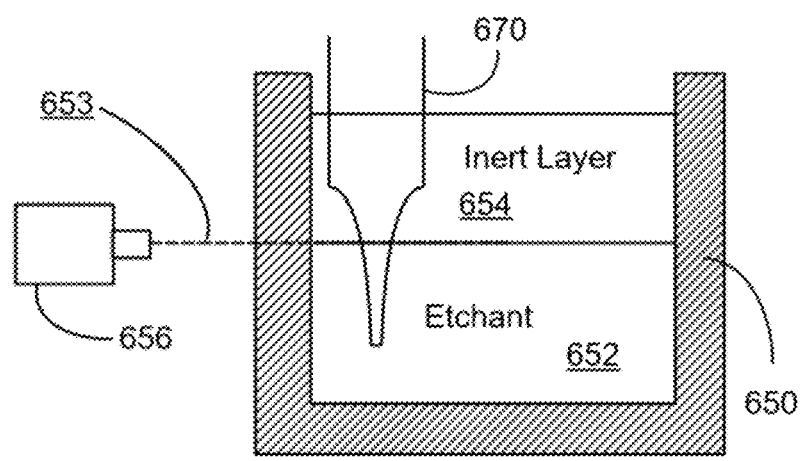
FIG. 6 illustrates an etch system according to an embodiment of the present invention.

FIG. 6 illustrates an etch system according to some embodiments. In the embodiment illustrated in FIG. 6, a sapphire or other etch-resistant container 650 is partially filled with an etchant solution 652 and an inert solution 654 (e.g., isooctane). The etchant solution 652 can include various components suitable for etching of the optical elements described herein, including hydrofluoric acid (HF), buffered oxide etch (BOE) solution, and the like. The etchant solution 652 may also include a surfactant such as ammonium fluoride, and the like. The inert solution 654 is less dense than the etchant solution in this implementation and prevents evaporation of the etchant and protects the portions of the fiber immersed in the inert solution from being etched, for example, by etchant evaporating and the resulting vapor etching the fiber. The inert layer can be referred to as a float layer in some implementations.

The portion of the fiber 670 to be etched is inserted into the etchant solution 652, for example, passing through the inert solution 654 to enter the etchant solution 652. As the fiber 670 is withdrawn from the etchant solution 652 at a predetermined rate, a desired profile may be etched into the etched portion of the fiber 670. In FIG. 6, the fiber 670 is illustrated as being inserted in a vertical direction that is perpendicular to the surface of the etchant solution 652. In some embodiments, the angle at which the fiber 670 is inserted and/or withdrawn is controlled, for example, varied as a function of time, to control the etching profile achieved.

FIG. 6 illustrates a camera 656, which can be used to image the fiber 670 as portions of the fiber 670 are immersed in etchant solution 652. In the embodiment illustrated in FIG. 6, the camera 656 is positioned level with the interface 653 between the inert solution 654 and the etchant solution 652. In other embodiments, the camera 656 can be placed above the interface, below the interface, or the like. In such off-set views, the camera 656 can observe the fiber 670 without an interfering image of a meniscus line of an etchant or refractive error that may be captured by viewing at an interface of different materials (such as an inert layer 654 or etchant layer 652). In other words, at off-set angles, the camera 656 may view the fiber 670 through a fewer number of intermediate mediums and calculate an etching rate based on captured images compensating for fewer indices of refraction the captured light propagated to arrive at the camera 656. Additionally, an off-set view may enable the collection of additional image information. While the level viewing depicted in FIG. 6 permits etching rate viewing as a function of diameter changes, an off-set view may capture certain circumference etch characteristics as well, such as how uniform the etch process is occurring along a fiber exterior, beyond simply the diameter width according to a particular view. Additionally, although a single camera is illustrated in FIG. 6, multiple cameras placed in various orientations with respect to the interface 653 can be utilized. Using the camera 656, a user is enabled to view the interface 653 and the fiber 670 during insertion and withdrawal from the etch system. As an example, using one or more cameras, the diameter of the fiber at the interface can be determined and utilized in controlling the etch process. Accordingly, embodiments of the present invention utilize one or more cameras, computer vision systems, and the like to achieve fiber elements with various sections having predetermined lengths and diameters as described herein.

During use of the etch systems illustrated in FIG. 6, the hydrophilic character of the fiber may result in a meniscus forming at the interface between the etchant 652 and the inert layer 654. As the fiber 670 is withdrawn from the etchant 652 (for example, at an increasing rate as a function of time to form a tapered profile in which the tip is etched more than the light delivery region), the etchant solution can thus adhere to the fiber 670 at a level above the surface of the etchant present at the edges of the container 650. This wicking of the etchant solution in the vicinity of the fiber 670 will be supported as the fiber 670 is withdrawn until the height reaches a point at which the pull of gravity exceeds the surface tension. At this point, the etchant solution will collapse back down to the level defined by the surface of the etchant 652. The additional etching that occurs during the time that the meniscus adheres to the fiber can result in scalloping of the fiber as an overlay on the desired fiber shape. In some embodiments, the fiber can be masked with an etch-resistant mask to form masked regions that will not be etched despite being inserted into the etchant solution.

According to some embodiments, a polarization-maintaining (PM) fiber may be used as a fiber optic scanning element in a fiber scanning system. A PM fiber may be a single-mode fiber in which linearly polarized light, if properly launched into the fiber, maintains a linear polarization during propagation, exiting the fiber in a specific linear polarization state. A PM fiber may be more desirable in some applications when compared to a fiber that does not maintain the polarization state of the light propagating in the fiber. For example, if light that is unpolarized (e.g., having random polarizations) is emitted from a non-PM fiber, some portion of the light may be lost when being incident on a prism.

PM fibers may be fabricated by intentionally introducing a systematic linear birefringence in the fiber, so that there are two, well defined polarization modes that propagate along the fiber with very distinct phase velocities. To create birefringence, stress may be permanently induced in a fiber using rods of another material embedded within the cladding. The rods may be referred to herein as "stress members." The stress members comprise a material with a coefficient of thermal expansion (CTE) different than that of the cladding, which may give rise to stress fields in the fiber. Alternatively, a fiber may be designed to be geometrically asymmetric (e.g., making the cladding to have an elliptical transverse cross-section) or have a refractive index profile which is asymmetric.

Figure 7A:
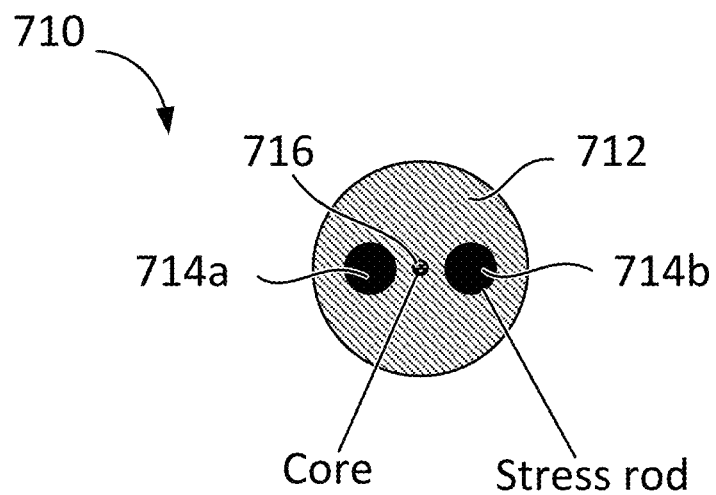
FIG. 7A shows a schematic cross-sectional view of a "Panda" PM fiber.

FIG. 7A shows a schematic cross-sectional view of a PM fiber 710, which is sometimes referred to as a Polarization-maintaining AND Absorption-reducing ("PANDA") fiber. The PM fiber 710 includes a core 716, a cladding 712 surrounding the core 716, and two stress members 714a and 714b embedded in the cladding 712 and positioned on opposite sides of the core 716. The stress members 714a and 714b may be rods made of a material different from that of the cladding 712. The rotationally asymmetric geometrical arrangement of the stress members 714a and 714b may produce stress birefringence. For the PANDA PM fiber 710, the stress members 714a and 714b have a circular cross section.

Figure 7B:
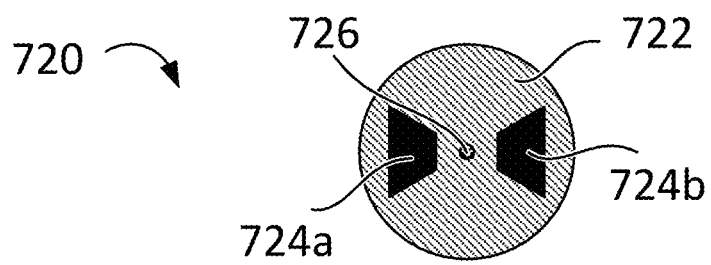
FIG. 7B shows a schematic cross-sectional view of a "Bow-tie" PM fiber.

FIG. 7B shows a schematic cross-sectional view of another PM fiber 720. The PM fiber 720 includes a core 726, a cladding 722 surrounding the core 726, and two stress members 724a and 724b embedded in the cladding 722 and positioned on opposite sides of the core 726. Similar to the "PANDA" PM fiber 710, the stress members 724a and 724b may be rods made of a material different from that of the cladding 722. The rotationally asymmetric geometrical arrangement of the stress members 724a and 724b may produce stress birefringence. For the PM fiber 720 illustrated in FIG. 7B, the stress members 724a and 724b have a trapezoidal cross section, which has led to a description of this geometry as a "Bow-tie" PM fiber.

Figure 7C:
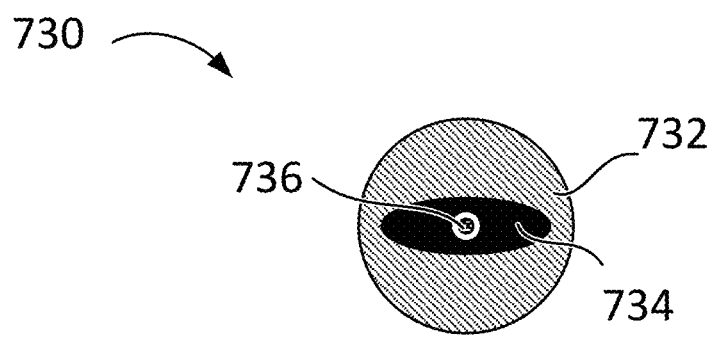
FIG. 7C shows a schematic cross-sectional view of an elliptical-clad PM fiber.

FIG. 7C shows a schematic cross-sectional view of an elliptical-clad PM fiber 730. The elliptical-clad PM fiber 730 includes a core 736, an inner cladding 734 surrounding the core 736, and an outer cladding 732 surrounding the inner cladding 734. The inner cladding 734 is made of a material different from that of the outer cladding 732 and has an elliptical cross section. The rotationally asymmetric geometry of the inner cladding 734 may produce birefringence in the PM fiber 730.

According to some embodiments, a tapered tip may be formed in a PM fiber by an etching process. Fabricating a tapered tip in a PM fiber may present some particular challenges. For example, an etching rate for the cladding material and the stress member material may be different, which may result in an undesirable shape of the fiber tip, as discussed below.

Figures 8A, 8B:
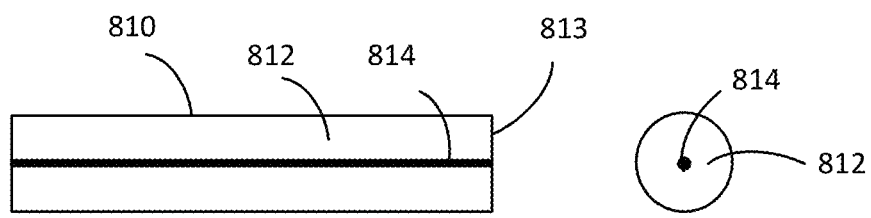
FIG. 8A is a simplified longitudinal cross-sectional view of the regular fiber before etching is performed.
FIG. 8B is an end view (looking at the tip of the fiber from the right in FIG. 8A).

FIG. 8A is a simplified longitudinal cross-sectional view of a non-PM fiber 810 before etching is performed and FIG. 8B is an end view (looking at the end surface 813 of the fiber 810 when viewed from the right in FIG. 8A). As illustrated, the fiber 810 includes a core 814 and a cladding 812 surrounding the core 814. The fiber 810 has a substantially uniform diameter along its length.

Figures 8C, 8D:
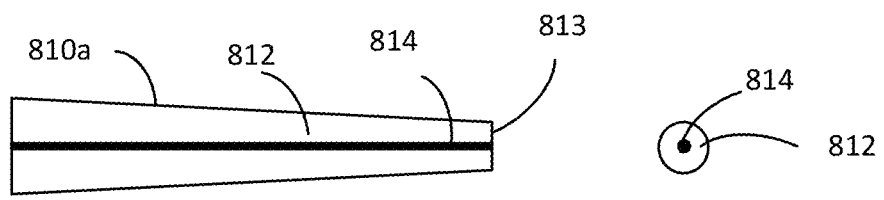
FIG. 8C is a simplified longitudinal cross-sectional view of the regular fiber after an etching process has been performed.
FIG. 8D is an end view (looking at the tip of the fiber from the right in FIG. 8C), according to some embodiments.

FIG. 8C is simplified longitudinal cross-sectional view of the non-PM fiber 810a after an etching process has been performed and FIG. 8D is an end view (looking at the end surface 813 of the fiber 810a when viewed from the right in FIG. 8C). The etching process may be performed, for example, using the method described above with reference to FIGS. 5A-5C and 6. As illustrated in FIG. 8C, after the etching process, the tip of the fiber 810 has a tapered shape as some portion of the cladding 812 has been etched away, resulting in a decreasing diameter along its length toward the very end of the fiber 810 adjacent end surface 813. As illustrated in FIG. 8D, the end surface 813 of the fiber 810a may have a substantially circular shape, assuming that the etching rate is uniform around the circumference of the side wall of the fiber 810.

Figure 9A:
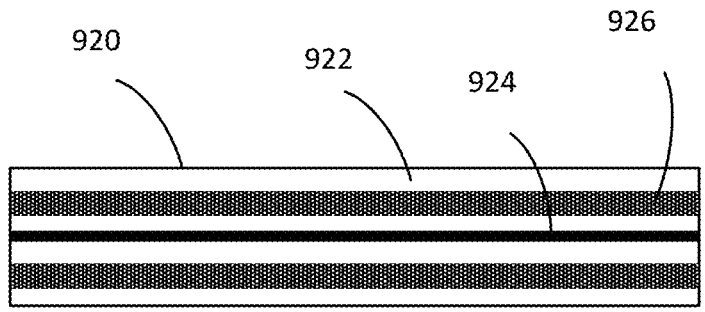
FIG. 9A is a simplified longitudinal cross-sectional view of a PM fiber before an etching process is performed.
Figure 9B:
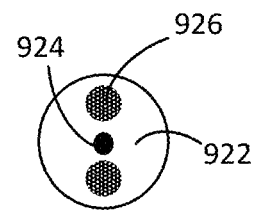
FIG. 9B is an end view (looking at the tip of the fiber from the right in FIG. 9A).

FIG. 9A is a simplified longitudinal cross-sectional view of a PM fiber 920 before an etching process is performed and FIG. 9B is an end view (looking at the end surface 913 of the fiber 920 when viewed from the right in FIG. 9A). The PM fiber 920 includes a core 924, a cladding 922 surrounding the core 924, and two stress members 926 (e.g., shaped as rods) imbedded in the cladding 922 on opposite sides of the core 924.

Figure 9C:
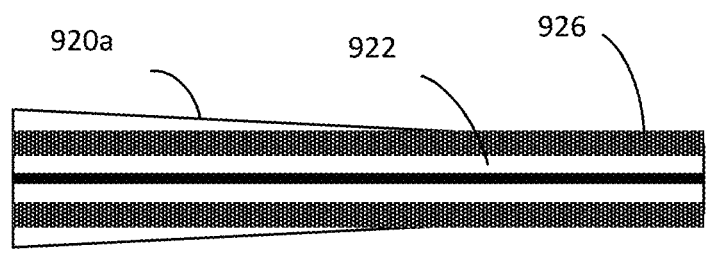
FIG. 9C is a simplified longitudinal cross-sectional view of the PM fiber after an etching process has been performed.
Figure 9D:
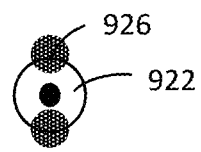
FIG. 9D is an end view (looking at the tip of the fiber from the right in FIG. 9C), according to some embodiments.

FIG. 9C is simplified longitudinal cross-sectional view of the PM fiber 920a after an etching process has been performed and FIG. 9D is an end view (looking at the end surface 913 of the fiber 920a when viewed from the right in FIG. 9C). The etching process may be performed, for example, using the method described above with reference to FIGS. 5A-5C and 6. As illustrated in FIG. 9C, after the etching process, the tip of the fiber 920a generally has a tapered shape as some portion of the cladding 922 has been etched away adjacent end surface 913. Here, because the etching rate for the stress members 926 and the etching rate for the cladding 922 may be quite different, the tip of the PM fiber 920 may have a non-circular transverse cross-section. For example, if the etching rate for the stress members 926 is significantly lower than the etching rate for the cladding 922, the stress members 926 may protrude out of the tapered portion of the cladding 922, resulting in a non-circular transverse cross-section, as illustrated in the end view in FIG. 9D.

For example, the cladding 922 may be fabricated using silica, and the stress members 926 may be fabricated using doped silica (e.g., boron-doped silica), or both the cladding 922 and the stress members 926 may be fabricated using doped silica but doped differently. For an etchant solution that includes a mixture of hydrofluoric acid (HF) and buffered oxide etch (BOE) at a certain ratio (e.g., a HF:BOE ratio of 0:1, 1:3, 2:3, 1:1, or the like), the etching rate for the cladding 922 may be greater than the etching rate for the stress members 926.

Figure 9E:
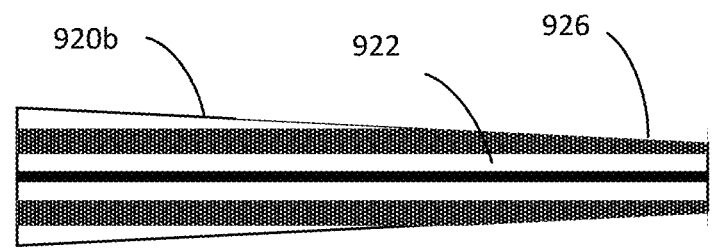
FIG. 9E is a simplified longitudinal cross-sectional view of the PM fiber after an etching process according to some embodiments.
Figure 9F:
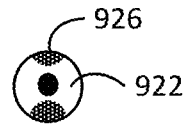
FIG. 9F is an end view (looking at the tip of the fiber from the right in FIG. 9E), according to some embodiments.

FIG. 9E is a simplified longitudinal cross-sectional view of the PM fiber 920b with a desired shape after an etching process according to some embodiments and FIG. 9F is an end view (looking at the end surface 913 of the fiber 920b when viewed from the right in FIG. 9E). As illustrated, it may be desirable that, after etching, the tip of PM fiber 920b has a substantially circular transverse cross-section, similar to that of the tapered tip for a regular fiber 810a illustrated in FIGS. 8C and 8D.

Embodiments described herein provide methods of fabricating a tapered tip of a PM fiber that overcome the problems discussed above with reference to FIGS. 9C and 9D to achieve desired tip shapes. The methods may involve a two-step etching process according to some embodiments. In a first step, the tip of a PM fiber is inserted into a first etchant solution that may be configured to preferentially etch the cladding at a faster rate than the stress members. In some embodiments, the tip of the PM fiber may be withdrawn slowly from the first etchant solution, so that the cladding may have a tapered shape at the tip of the PM fiber with a desired profile (e.g., using the method described above with reference to FIGS. 5 and 6). Because of the preferential etching of the cladding over the stress members, a portion of the stress members may protrude from the tapered portion of the cladding at the tip of the PM fiber (e.g., as illustrated in FIGS. 9C and 9D). In a second step, the tip of the PM fiber is subsequently inserted into a second etchant solution that may preferentially etch the stress members at a faster rate than the cladding. In some embodiments, the tip of the PM fiber may be immersed in the second etchant solution for a certain time duration, and then be withdrawn from the second etchant solution rather quickly when compared to a slow withdrawal process as discussed in relation to the use of the first etchant solution. After the second step, the portion of the stress members that protrudes from the cladding may be etched away, resulting in a substantially circular transverse cross-section at the tip of the PM fiber (e.g., as illustrated in FIGS. 9E and 9F).

In some embodiments, the first etchant solution includes a first mixture of hydrofluoric acid (HF) and buffered oxide etch (BOE) at a first HF-to-BOE ratio, and the second etchant solution includes a second mixture of HF and BOE at a second HF-to-BOE ratio different from the first HF-to-BOE ratio. For example, the first HF-to-BOE ratio may be 1:3, 2:3, 1:1, or the like; and the second HF-to-BOE ratio may be 3:2, 3:1, 1:0 (100% HF), or the like. Because HF may preferentially etch the stress members at a greater rate than the cladding, the first etchant solution, which has a lower HF percentage in the embodiment listed above, may etch the cladding at a higher rate than the stress members, while the second etchant solution, which has a higher HF percentage, may etch the stress members at a greater rate than the cladding.

In some embodiments, in the first step, the PM fiber may be withdrawn slowly from the first etchant solution at a predetermined withdrawal rate, so that the cladding may have a desired profile at the tip of the PM fiber. For example, the slope of the taper can be large in the light delivery region (distant from the end of the tip) and smaller in the light emission region (adjacent the end of the tip), as discussed above with reference to FIG. 4.

In some embodiments, the stress members may have a transverse cross-sectional shape other than circular. For example, the transverse cross-section of the stress members may have a trapezoidal shape to form the "bow-tie" PM fiber illustrated in FIG. 7B. In some embodiments, the PM fiber may include a tube-shaped stress member with an elliptically shaped transverse cross-section, as illustrated in FIG. 7C. One of ordinary skill in the art would recognize many variations, alternatives, and modifications.

Figure 10A:
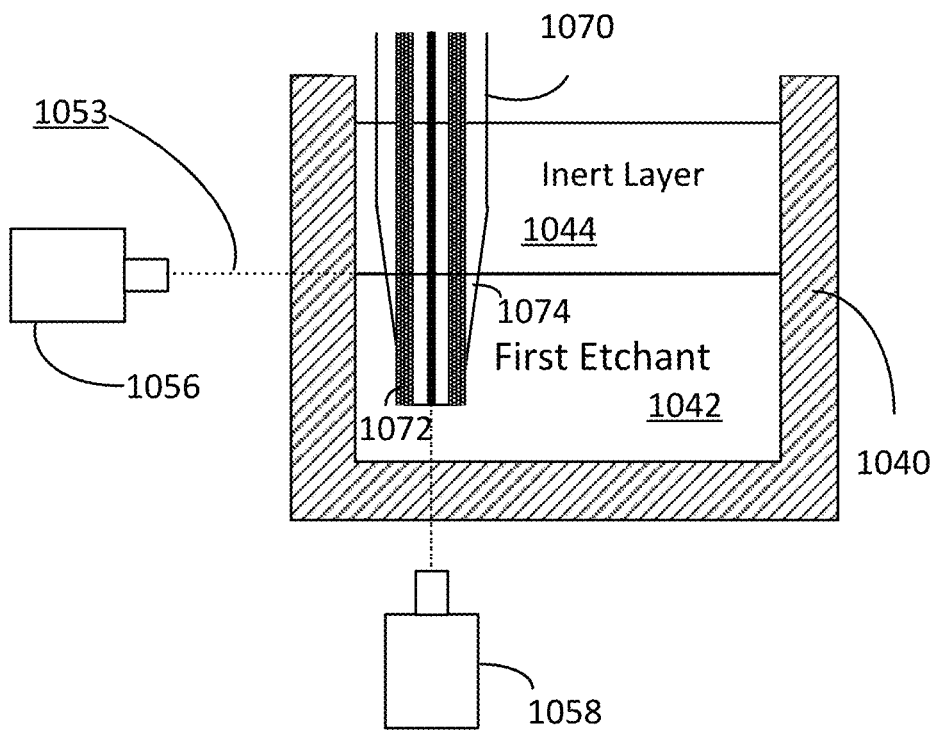
FIGS. 10A-10B illustrate an etch system for fabricating a tapered tip in a PM fiber according to some embodiments.
Figure 10B:
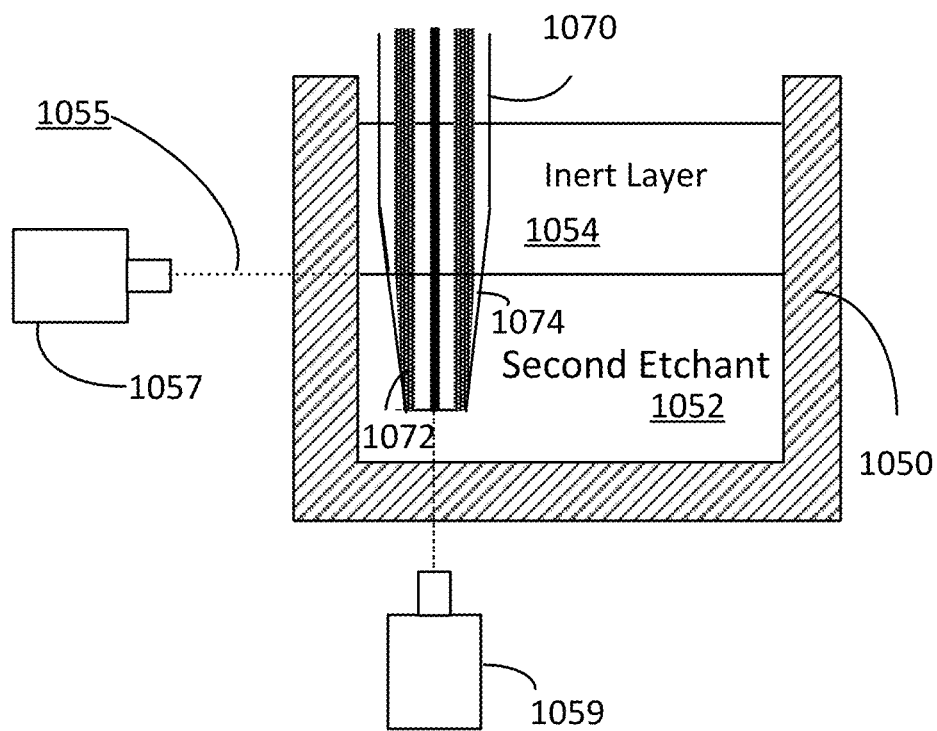

FIGS. 10A-10B illustrate an etch system for fabricating a tapered tip in a PM fiber according to some embodiments. As illustrated in FIG. 10A, for a first step of an etching process, a sapphire or other etch-resistant container 1040 is partially filled with a first etchant solution 1042 and an optional inert solution 1044 (e.g., isooctane). The first etchant solution 1042 can include various components suitable for etching of the optical elements described herein. For example, the first etchant solution 1042 may include a first mixture of hydrofluoric acid (HF) and buffered oxide etch (BOE) at a first HF-to-BOE ratio. The first etchant solution 1042 may also include a surfactant such as ammonium fluoride, and the like. The inert solution 1044 may be less dense than the first etchant solution 1042 in this implementation, which prevents evaporation of the first etchant solution 1042 and protects the portions of the PM fiber 1070 immersed in the inert solution 1044 from being etched, for example, by the etchant evaporating and the resulting vapor etching the PM fiber 1070. The inert layer 1044 can be referred to as a float layer in some implementations. In some embodiments, the PM fiber 1070 may be masked with an etch-resistant mask to form masked regions that will not be etched despite being inserted into the first etchant solution 1042.

The portion of the PM fiber 1070 to be etched is inserted into the first etchant solution 1042, for example, passing through the inert solution 1044 to enter the first etchant solution 1042. As the PM fiber 1070 is withdrawn from the first etchant solution 1042 at a predetermined rate, a desired profile is etched into the etched portion of the PM fiber 1070. In FIG. 10A, the PM fiber 1070 is illustrated as being inserted in a vertical direction that is perpendicular to the surface of the first etchant solution 1042. In some embodiments, the angle at which the PM fiber 1070 is inserted and/or withdrawn is controlled, for example, varied as a function of time, to control the etching profile achieved.

FIG. 10A illustrates a first camera 1056, which can be used to image the PM fiber 1070 as portions of the PM fiber 1070 are immersed in the first etchant solution 1042. In the embodiment illustrated in FIG. 10A, the field of view of the first camera 1056 is directed at a side of the PM fiber 1070, and is positioned level with the interface 1053 between the inert solution 1044 and the first etchant solution 1042. In other embodiments, the first camera 1056 can be placed above the interface 1053, below the interface 1053, or the like. Using the first camera 1056, a user is enabled to view the interface 1053 and the PM fiber 1070 during insertion and withdrawal from the first etchant solution 1042. As an example, the diameter of the PM fiber 1070 at the interface 1053 can be determined, which can be utilized as a feedback to control the etch process. Such real-time monitoring and feedback control can be useful for achieving consistent tapering profiles of the fiber tip, as there may be many variables (e.g., the etchant composition, the temperature, and the like) in the etch process.

In some embodiments, additional cameras may be used to view the PM fiber 1070 from other angles. For example, as illustrated in FIG. 10A, a second camera 1058 can be placed at the bottom of the container 1040 for viewing the end of the PM fiber 1070 (i.e., the field of view of the second camera 1058 is directed at the end of the PM fiber 1070). In some embodiments, another camera (not shown in FIG. 10A) can be positioned to view the PM fiber 1070 from the side similar to the first camera 1056, but vertically offset from the first camera 1056 so that it views another portion of the PM fiber 1070 along the length. Accordingly, embodiments of the present invention utilize one or more cameras, computer vision systems, or the like to achieve fiber elements with various sections having predetermined lengths and diameters as described herein.

The first etchant solution 1042 may be configured to preferentially etch the cladding 1074 at a faster rate than the stress members 1072. As discussed above, as a result, after the first step of the etching process, a portion of the stress members 1072 may protrude from the cladding 1074 in the tapered portion of the PM fiber 1070. The portion of the stress members 1072 that protrudes from the cladding 1074 may be removed during a second step of the etching process, as discussed below.

FIG. 10B shows a second sapphire or other etch-resistant container 1050 that is partially filled with a second etchant solution 1052 and an optional inert solution 1054 (e.g., isooctane). The second etchant solution 1054 may be configured to preferentially etch the stress members 1072 at a faster rate than the cladding 1074. After the PM fiber 1070 is immersed in the second etchant solution 1052 for a certain time duration, the portion of the stress members 1072 that protrudes from the cladding 1074 may be etched away, resulting in a substantially smooth tapered profile at the tip of the PM fiber 1070.

FIG. 10B illustrates a third camera 1057 and a fourth camera 1059, which can be used to image the PM fiber 1070 so as to monitor the progress as the portion of the stress members 1072 that protrudes from the cladding 1074 is removed by the second etchant solution 1052. In the embodiment illustrated in FIG. 10B, the third camera 1057 is positioned level with the interface 1055 between the inert solution 1054 and the second etchant solution 1052. In other embodiments, the third camera 1057 can be placed above the interface 1055, below the interface 1055, or the like. The monitoring can be used to control the time duration the PM fiber 1070 is immersed in the second etchant 1052. In some embodiments, the index of refraction of the second etchant solution 1052 may substantially match the index of refraction of the cladding 1074. In such cases, the cameras 1057 and 1059 may see only the stress members 1072. In addition, the portion of the stress members 1072 that protrudes from the cladding 1074 may have some lensing effect from the view of the third camera 1057. As the stress members 1072 protruding from the cladding 1074 are being etched away, the lensing effect may change, which can be used as a signature for monitoring the progress of the etching.

In some embodiments, light may be injected into the PM fiber 1070, either during the etching process (e.g., the first step and/or the second step), or offline between the first step and the second step, so as to enable the cameras to have a better view of the PM fiber 1070 for better control.

In some embodiments, the etch system may include only one container that is used for both the first step and the second step of the etching process. For example, after the first step, the first container 1040 may be emptied, and the second etchant solution 1052 and the inert layer 1054 may be added to the first container 1040 for the second step of the etching process. In such cases, only one set of cameras (e.g., the first camera 1056 and the second camera 1058) may be needed. One of ordinary skill in the art would recognize many variations, alternatives, and modifications.

FIG. 11 shows a simplified flowchart illustrating a method 1100 of forming a tapered tip of a polarization-maintaining (PM) fiber according to some embodiments.

The method 1100 includes, at 1110, inserting a tip of the PM fiber into a first etchant solution. The PM fiber includes a core, a cladding surrounding the core, and one or more stress members embedded in the cladding. The first etchant solution is characterized by a first etching rate for the cladding and a second etching rate for the one or more stress members. The second etching rate is lower than the first etching rate.

The method 1100 further includes, at 1120, withdrawing the tip of the PM fiber from the first etchant solution at a withdrawal rate.

The method 1100 further includes, at 1130, after the tip of the PM fiber is withdrawn from the first etchant solution, immersing the tip of the PM fiber in a second etchant solution for a time duration. The second etchant solution is characterized by a third etching rate for the cladding and a fourth etching rate for the stress members. The fourth etching rate is greater than the third etching rate.

The method 1100 further includes, at 1140, withdrawing the tip of the PM fiber from the second etchant solution.

It should be appreciated that the specific steps illustrated in FIG. 11 provide a particular method of forming a tapered tip of a PM fiber according to some embodiments. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
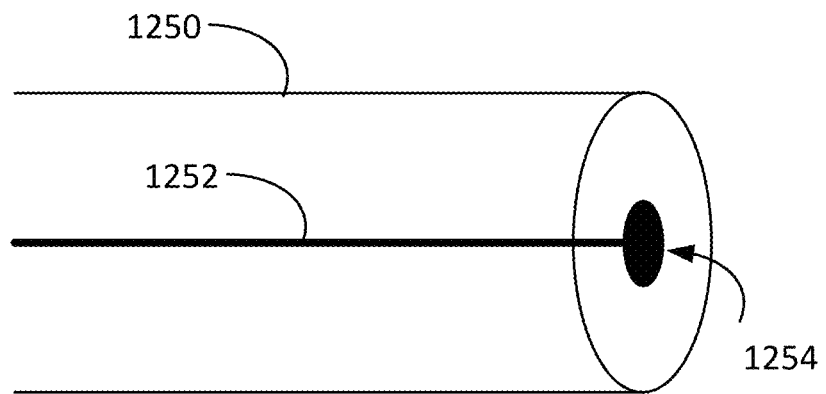
FIG. 12 is a simplified perspective view illustrating a fiber with a protective cover according to an embodiment of the present invention.

FIG. 12 is a simplified perspective view illustrating a fiber with a protective cover according to an embodiment of the present invention. As will be evident to one of skill in the art, the waveguiding properties of a fiber results from the different indices of refraction associated with the different materials utilized for the core and cladding of the fiber. As an example, for a fiber with a cladding of fused silica and a doped fused silica core, thereby providing a different refractive index, the core/cladding interface may be susceptible to ingress by the etchant (e.g., an HF-based etchant) and the etchant can wick along either the interface or into the core and preferentially etch the core. Additionally, etching rates for the core and the clad may be different, so the core may etch more quickly than the cladding.

Accordingly, embodiments of the present invention protect the core with a protective cover to prevent this core etching. The protective cover (e.g., an etch-resistant coating) can cover the entire end or only a portion of the end.

Referring to FIG. 12, the fiber 1250 includes core 1252. Protective cover 1254 is formed on the end of the fiber to protect the core from preferential etching during etch processing. In various embodiments, the protective cover 1254 is formed on the end of the fiber before the first step of an etching process, or after the first step and before a second step of the etching process, as discussed above. The protective cover 1254 may comprise an etch-resistant material.

Figure 13:
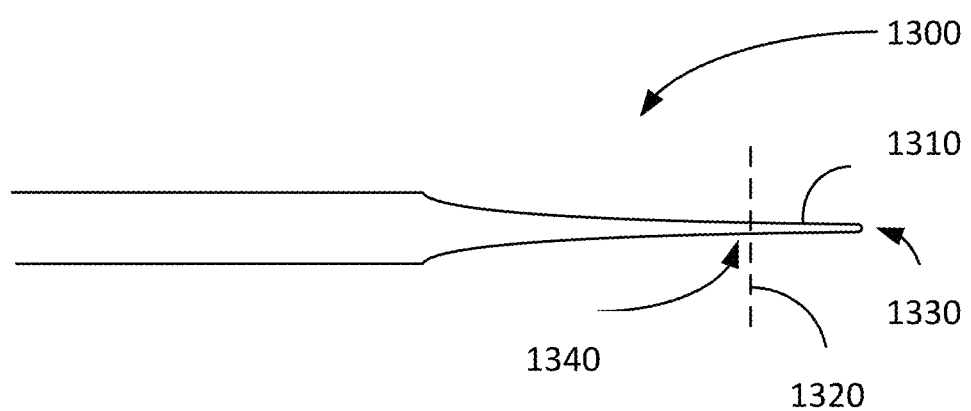
FIG. 13 is a simplified side view illustrating a method of fabricating a tapered tip of a fiber according to some embodiments.

FIG. 13 is a simplified side view illustrating a method of fabricating a tapered tip of a fiber 1300 according to some embodiments. In this example, the tapered portion is initially made longer than the needed length (e.g., using the etch process discussed above). Then a portion of the tapered tip at the light emission region 1310 may be removed (e.g., broken off) along the dashed line 1320 to form an exposed end that did not undergo etching. In this way, even if the end 1330 of the fiber 1300 was not protected by a protective cover during the etch process, the exposed end 1340 of the fiber 1300, (i.e., exposed after the end portion is removed) was not subject to etching. Also, for some fibers, the dopants in the core may leak out into the cladding. In such cases, etching of the core and etching of the region in the vicinity of the core into which dopant leaking occurs can occur at different rates and can cause undesired end profiles. By removing the end portion of fiber as illustrated in FIG. 13, such problems can be avoided.

Figure 14:
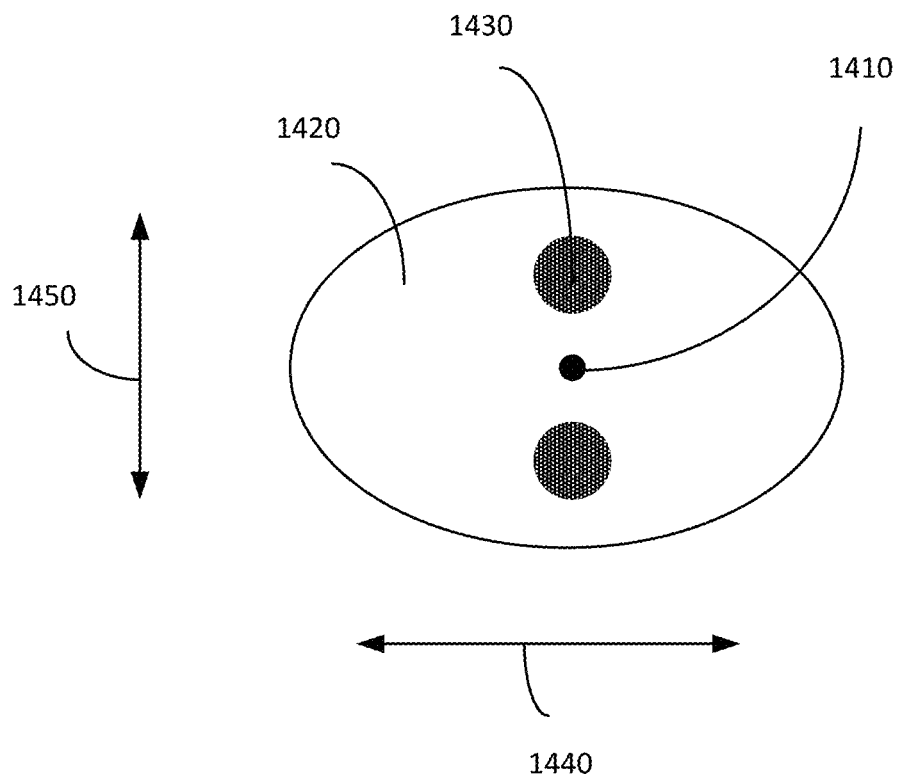
FIG. 14 is a simplified transverse cross-sectional view of a tip of a PM fiber according to some embodiments.

FIG. 14 is a simplified transverse cross-sectional view of a tip of a PM fiber according to some embodiments. The PM fiber includes a core 1410, a cladding 1420, and two stress members 1430 embedded in the cladding 1420 on opposite sides of the core 1410 along the direction 1450. Here, the cladding 1420 has an elliptical cross-section with its long axis along the direction 1440. The stress members 1430 may make the PM fiber more stiff in the direction 1450. Concurrently, the elliptically shaped cladding 1420 may make the PM fiber more stiff in the direction 1440, balancing potential asymmetry caused by the stress members 1430 to some extent. Accordingly, the resonance frequencies of the PM fiber can be similar in the two directions 1440 and 1450, which can be desirable in some cases. For example, to scan the end of the PM fiber in a Lissajous scan pattern, the tip of the PM fiber may be scanned in the two directions 1440 and 1450 at two frequencies that are close, but not identical. In such cases, it may be advantageous to have the resonance frequencies in the two directions 1440 and 1450 comparable to each other, so that the PM fiber may be driven at those resonance frequencies for efficient energy transfer.

According to some embodiments, the elliptical shape of the cladding 1420 at the tip of the PM fiber may be achieved by controlling the flow of the etchant around the tip of the PM fiber. For example, the flow of the etchant may be controlled such that it pushes the PM fiber in the direction of 1450, so as causing more aggressive etching of the cladding 1420 in that direction.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of forming a tapered tip of a polarization-maintaining (PM) fiber, the method comprising:
   inserting a tip of the PM fiber into a first etchant solution, the PM fiber including a core, a cladding surrounding the core, and one or more stress members embedded in the cladding, the first etchant solution being characterized by a first etching rate for the cladding and a second etching rate for the one or more stress members, the second etching rate being lower than the first etching rate;
   withdrawing the tip of the PM fiber from the first etchant solution at a withdrawal rate to produce a remaining portion of the cladding and a portion of the one or more stress members protruding from the remaining portion of the cladding;
   after the tip of the PM fiber is withdrawn from the first etchant solution, immersing the tip of the PM fiber in a second etchant solution for a time duration, the second etchant solution being characterized by a third etching rate for the cladding and a fourth etching rate for the stress members, the fourth etching rate being greater than the third etching rate; and
   withdrawing the tip of the PM fiber from the second etchant solution, wherein the tip of the PM fiber is characterized by a substantially circular transverse cross section.

2. The method of claim 1 further comprising, before inserting the tip of the PM fiber into the first etchant solution, coating an end of the PM fiber with an etch-resistant coating.

3. The method of claim 2 wherein the etch-resistant coating covers the core at the end of the PM fiber.

4. The method of claim 1 further comprising, before immersing the tip of the PM fiber in the second etchant solution, coating an end of the PM fiber with an etch-resistant coating.

5. The method of claim 4 wherein etch-resistant coating covers the core at the end of the PM fiber.

6. The method of claim 1 further comprising imaging, while withdrawing the tip of the PM fiber from the first etchant solution, the tip of the PM fiber using one or more cameras.

7. The method of claim 6 wherein a field of view of one of the one or more cameras is directed at an end of the PM fiber.

8. The method of claim 6 wherein a field of view of one of the one or more cameras is directed at a side of the PM fiber.

9. The method of claim 6 further comprising controlling the withdrawal rate based on the imaging.

10. The method of claim 1 further comprising imaging the tip of the PM fiber while the tip of the PM fiber is immersed in the second etchant solution using one or more cameras.

11. The method of claim 10 further comprising controlling the time duration based on the imaging.

12. The method of claim 1 wherein:
    the first etchant solution comprises a first mixture of hydrofluoric acid (HF) and buffered oxide etch (BOE) at a first HF-to-BOE ratio; and
    the second etchant solution comprises a second mixture of HF and BOE at a second HF- to-BOE ratio different from the first HF-to-BOE ratio.

13. The method of claim 12 wherein the second HF-to-BOE ratio is greater than the first HF-to-BOE ratio.

14. The method of claim 13 wherein the first HF-to-BOE ratio ranges from about 1:5 to about 1:1.

15. The method of claim 14 wherein the second HF-to-BOE ratio ranges from about 3:2 to about 1:0.

16. The method of claim 1 wherein, the remaining portion of the cladding is formed by removing a portion of the cladding at the tip of the PM fiber via etching by the first etchant solution.

17. The method of claim 1 wherein, the substantially circular transverse cross section is formed by removing the portion of the one or more stress members protruding from the remaining portion of the cladding via etching by the second etchant solution.

18. The method of claim 1 wherein the one or more stress members comprise two stress members disposed on opposite sides of the core.

19. The method of claim 18 wherein each of the two stress members has a circular cross section or a trapezoidal cross section.

* * * * *